Jan. 24, 1950     F. H. MUELLER     2,495,596
LUBRICATED VALVE
Filed June 27, 1945
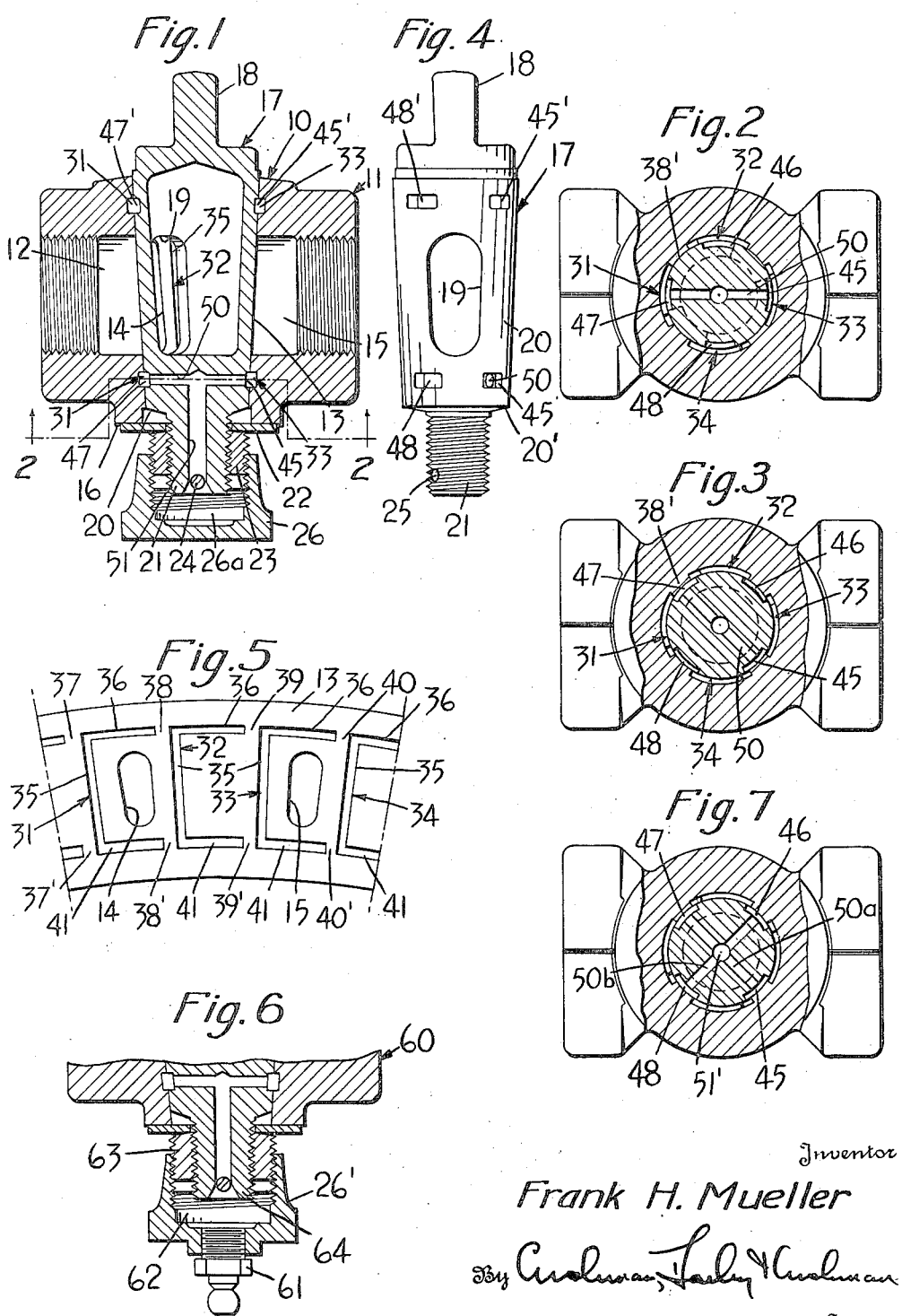

Patented Jan. 24, 1950

2,495,596

UNITED STATES PATENT OFFICE 2,495,596

LUBRICATED VALVE

Frank H. Mueller, Decatur, Ill., assignor to Mueller Co., Decatur, Ill., a corporation of Illinois Application June 27, 1945, Serial No. 601,735

14 Claims. (Cl. 251—93)

The present invention relates to lubricated valves.

Objects of the invention are to provide lubricated valves which will include an efficient seal about the flow line, can be readily supplied with lubricant and which are of such design that they can be readily and economically manufactured.

Other objects and advantages of the invention will be apparent from the following specification and attached drawings wherein.

Figure 1 is a central section through the valve, the plug being illustrated in half opened position, Figure 2 is a transverse section on the line 2—2 of Figure 1, Figure 3 is a transverse section on the line 2—2 of Figure 1 but showing the plug in closed position, Figure 4 is an elevation of the plug, Figure 5 is a development of the seating surface of the valve casing, Figure 6 is a fragmentary central section of a modified form of valve, and Figure 7 is a view similar to Figure 3 but showing the plug provided with a modified arrangement of lubricant supply passages.

Referring to Figures 1 to 5, the numeral 10 generally designates the valve of these figures which includes a casing 11 provided with a flow line 12 and a tapered seating surface 13. The flow line 12 opens to the seating surface 13 through flow line ports 14 and 15. The larger end of the seat 13 opens to the exterior of the casing 11 and its smaller end also is open but surrounded by an annular surface or shoulder 16 which lies in a plane normal to the axis of the seat 13.

The plug 17 is tapered and its larger end extends to the exterior of the casing and includes an operating shank 18. Plug 17 has flow ports 19 adapted to cooperate with the ports 14 and 15 to control flow through the valve.

The seating surface 20 of plug 17 is of such length that when it is seated in the casing its smaller end 20' will terminate short of the annular surface 16 of the casing. A stem 21 extends from the smaller end of the plug and past the annular surface 16 and has a washer 22 fitted thereon, the washer being spring material, such as phosphor bronze or steel. Stem 21 is threaded and a sleeve 23 is thereby adjustable along the stem 21, the sleeve being locked in adjusted position by means of a pin 24 extending through a radial aperture 25 in the stem and into crenelations or slots in the outer end of the sleeve. The outer surface of sleeve 23 is threaded to receive a grease cap 26 which thereby defines the outer walls of a grease chamber 26a. Because cap 26 is recessed, it cooperates with sleeve 23 to form a lubricant chamber.

The plug 17 can be held firmly seated in the casing seat 13 by threading the sleeve 23 upwardly along the plug stem 21 to bear upon the outer surface of the spring washer 22. It will be observed that the outer diameter of sleeve 23 is less than the inner diameter of the annular shoulder of surface 16 and that the inner end of sleeve 23 is inclined downwardly and outwardly from its central bore. As a result of this arrangement, the sleeve 23 can be threaded inwardly to a sufficient extent to slightly bend the resilient washer 22 to dished form. In any event, this construction enables the washer to bend to a dished form so that the plug may lift from its seat when the lubricant pressure at the seating surfaces is increased. The sleeve 23 thereby serves as a shoulder element which bears on washer 22 to hold the plug resiliently sealed.

The lubricating system of the valve of Figures 1 to 5 involves the provision in the seating surface 13 of the casing of four substantially C-shaped grooves such as illustrated in Figure. 5. These grooves are respectively designated as 31, 32, 33 and 34 and each groove includes a longitudinal portion 35, these portions being equidistantly spaced circumferentially of the casing seat 13 so as to be 90° apart. It will be observed that the casing port 14 opens to the seat 13 equidistantly between the longitudinal portions 35 of the grooves 31 and 32 and that the port 15 is similarly positioned with respect to the longitudinal portions 35 of the grooves 33 and 34. Each of the four C-shaped grooves also includes an upper transversely extending portion 36 positioned between the ports 14 and 16 and the larger end of the seat. Each of these portions 36 has its free end terminating at a point spaced from the adjacent end of the transverse portion 36 of the next C-shaped groove. In this way, lands 37, 38, 39 and 40 are provided in the seat 13 between the transversely extending portions 36 of the C-shaped grooves.

The lower portions of the C-shaped grooves, i. e., the portions between the smaller end of the seating surface and the flow line ports 14 and 15, are formed by transversely extending groove sections 41 each having its free end spaced from the adjacent C-shaped groove to provide lands 37', 38', 39' and 40'.

The plug 17 of Figures 1 to 5 is provided adjacent its smaller end with recesses 45, 46, 47 and 48 which are spaced 90° apart as shown in Figures 2 to 4. Each of these recesses is very slightly longer in a circumferential direction than the lands 37' to 40'. As shown in Figures 1 to 4, the recesses 45 and 47 open to a straight passage 50 which extends diametrically through the plug. Because this passage is straight and lies in a single plane, it readily can be formed by a single drilling operation. A central axial passage 51 extends from the diametrical passage 50 to the outer end of the stem 21 and the lubricant chamber 26a. The locking pin 24 extends across the passage 51 as illustrated in Figure 1 and it is therefore necessary to have at least the outer end of passage 51 of greater diameter than the pin 24.

It will be observed from Figure 1 that the recesses 45 to 48 and the diametrically extending passage 50 all lie in the same plane as the lower transverse portions 41 of the C-shaped grooves.

As best shown in Figures 1 to 4, the larger end of the plug 17 is provided with recesses 45', 46', 47' and 48'. These recesses respectively lie in the same radial planes as the recesses 45 to 48 and are slightly longer than the lands 37 to 40 provided between the upper portions 36 of the C-shaped casing grooves. In addition, the recesses 45' to 48' lie in the same plane as the upper portions 36 of the C-shaped grooves.

When the plug is in the closed position illustrated in Figure 3, the recesses 45 to 48 at the small end of the plug will bridge the lands 37' to 40' and the recesses 45' to 48' will be opposite and bridge the lands 37 to 40. As a result, the flow ports 14 and 15 of the casing and the port 19 in the plug will be completely surrounded by lubricant in the seating surface lubricant system. When the valve 10 of Figures 1 to 5 is in opened position, the recesses will bridge lands so that the larger and smaller ends of the seating surface will be sealed against leakage by circumferential bands of lubricant.

In Figure 3, the valve 10 of Figures 1 to 5 is shown in closed position. The plug 17 is moved from the closed position of the Figure 3 to an open position by rotation in a counterclockwise direction with respect to Figures 2 and 3 and midway of this movement it would reach the position illustrated in Figures 1 and 2. It will be observed from Figure 1 that in the midway position the plug port 19 is open to the longitudinal portions 35 of the C-shaped groove 32 and is also open to the flow line port 14. However, the pressure exerted from the lubricant chamber 26a will not be effective on the grease in the C-shaped passage 32 at this time because, as was indicated in Figures 1 and 2, the passage 50 which communicates with the lubricant chamber 26a is at this moment in communication with the C-shaped groove 31 and, as best shown in Figure 2, a blank area of the seating surface of plug 17 is opposite the land 38'. Therefore, grease cannot be forced from the groove system by the pressure in the lubricant chamber 26a.

The valve 60 indicated in Figure 6 differs from the valve 10 in the Figures 1 to 5 in that its grease cap 26' is equipped with a grease pressure fitting 61 to which a lubricant pressure gun may be connected to enable grease to thereby be supplied under pressure to the chamber 62 defined by the grease cap, sleeve 63 and the stem 64.

A result of the arrangement disclosed in Figure 6 is that the chamber 62 may be supplied with grease without removing the cap 26'. Although the cap 26 of Figures 1 to 5 must be removed for that purpose, the device of Figures 1 to 5 uses grease in bulk, which has a lower cost than the stick lubricant ordinarily used with a grease gun.

The valve disclosed in Figure 7 differs from that of Figures 1 to 5 in that the plug is provided with two diametrically extending passages 50a and 50b arranged at right angles to each other, instead of the single passage 50 used in the valve 10. As a result, each of the recesses 45' to 48' at the smaller end of the plug is in permanent communication with a lubricant chamber such as 26a through the axially extending passage portion 51'. By this construction, the pressure of lubricant will not be cut off in a C-shaped passage when the plug port is open to that passage and also open to the casing flow line as indicated in Figure 1. Such an arrangement is entirely satisfactory when the flow line pressure is relatively low and if the lubricant used in the system is heavy and not under high pressure. It is also satisfactory in a valve which is only operated after long intervals of time.

As has been indicated above, the present invention is simple and economical in manufacture because the passages 50 and 51 of Figure 1 as well as the passages 50a, 50b and 51' of Figure 7 can be readily formed by a minimum number of drilling operations. In addition, the structures provided at the smaller end of the plug and the seat for enabling the valve to be held seated by resilient action and at the same time provide a lubricant chamber is extremely simple and efficient and requires a minimum degree of machine work. Nevertheless, despite the minimum number of simple parts required, the seating tension exerted by washer 22 can be adjusted independently of the pressure exerted on the grease by the caps 26 and 26'.

The terminology used in the specification is for the purpose of description and not of limitation, the scope of the invention being defined in the claims.

I claim:

1. In a valve, a casing including a flow line and a tapered seating surface extending transversely of the flow line, the smaller end of the seating surface opening to the exterior of the casing, a ported plug including a tapered seating surface to engage the casing seating surface, at least one of the seating surfaces being provided with lubricant grooves, a stem on the smaller end of the plug, a shoulder element on the stem, a washer positioned between the stem shoulder element and an opposed surface on the casing, a recessed element adjustably engaging the stem shoulder element and cooperating with the latter to form an adjustable lubricant chamber, and the plug stem being provided with a passage extending from the seating surface lubricant grooves to the interior of the lubricant chamber.

2. In a valve, a casing including a flow line and a tapered seating surface extending transversely of the flow line, the smaller end of the seating surface opening to the exterior of the casing, a ported plug including a tapered seating surface to engage the casing seating surface, at least one of the seating surfaces being provided with lubricant grooves, a stem on the smaller end of the plug, a shoulder element on the stem, resilient means positioned between the stem shoulder element and an opposed surface on the casing, a recessed element adjustably engaging the stem shoulder element and cooperating with the latter to form an adjustable lubricant chamber, and the plug stem being provided with a passage extending from the seating surface lubricant grooves to the interior of the lubricant chamber.

3. A valve of the character defined in claim 2 wherein said resilient means is a resilient washer.

4. A valve of the character defined in claim 2 wherein said shoulder element comprises a sleeve threaded on the plug stem.

5. A valve of the character defined in claim 2 wherein said lubricant grooves substantially surround the plug port and flow line ports in open and closed positions of the plug.

6. A valve of the character defined in claim 2 wherein said recessed element is provided with means to enable lubricant to be delivered thereto under pressure.

7. A valve of the character defined in claim 2 wherein the passage in the plug stem includes a straight portion extending diametrically of the stem and opening to the plug seating surface and a portion extending between the diametrically extending portion and the outer end of the stem.

8. A valve of the character defined in claim 2 wherein the passage in the plug stem includes two straight intersecting portions extending at right angles to each other and opening to the plug seating surface, and a portion extending between the diametrically extending portions and the outer end of the stem.

9. A valve of the character defined in claim 2 wherein said resilient means is a resilient washer and the inner surface of said shoulder element is conical.

10. In a valve, a casing including a flow line and a tapered seating surface extending transversely of the flow line, the smaller end of the seating surface opening to the exterior of the casing, a tapered and ported plug in the seat and including a seating surface, at least one of the seating surfaces being provided with lubricant grooves, the smaller end of the plug including a stem extending to the exterior of the casing, a washer apertured to fit upon the stem of the plug and of sufficient outside diameter to bear upon the casing, a sleeve secured to the stem portion of the plug and bearing upon the washer, a recessed element adapted to contain lubricant adjustably carried by the sleeve, and a passage extending from the seating surface of the plug and through the stem portion to the space defined within the cap.

11. A valve of the character defined in claim 10 wherein the washer is resilient and the sleeve secured to the plug stem portion bears upon the washer in an annular area of less diameter than the area in which the washer bears upon the casing.

12. A valve of the character defined in claim 10 wherein the plug stem portion is threaded and the recessed element is threaded on the sleeve.

13. A valve of the character defined in claim 10 wherein the washer is resilient, the sleeve is threaded on the stem, and the recessed element is threaded on the sleeve.

14. A valve of the character defined in claim 10 wherein the inner end of said sleeve is conical.

FRANK H. MUELLER.

REFERENCES CITED

The following references are of record in the file of this patent:

UNITED STATES PATENTS

| Number | Name | Date |
|---|---|---|
| 1,365,116 | Martin | Jan. 11, 1921 |
| 1,534,866 | Page | Apr. 21, 1925 |
| 2,069,013 | Nordstrom | Jan. 26, 1937 |
| 2,169,810 | Mueller | Aug. 15, 1939 |
| 2,216,150 | Wilkins | Oct. 1, 1940 |
| 2,296,650 | Mueller | Sept. 22, 1942 |